(12) United States Patent
Brimson et al.

(10) Patent No.: US 9,079,726 B2
(45) Date of Patent: Jul. 14, 2015

(54) CONTAINED TRANSFER OF MATERIALS

(75) Inventors: Michael Ronald Brimson, Selston (GB); Stephen Thomas McAleavy, Doncaster (GB)

(73) Assignee: Ezi-Dock Systems Limited, Kirby-in-Ashfield (GB)

( * ) Notice: Subject to any disclaimer, the term of this patent is extended or adjusted under 35 U.S.C. 154(b) by 0 days.

(21) Appl. No.: 13/384,212

(22) PCT Filed: Jul. 14, 2010

(86) PCT No.: PCT/GB2010/051151
§ 371 (c)(1),
(2), (4) Date: May 3, 2012

(87) PCT Pub. No.: WO2011/007170
PCT Pub. Date: Jan. 20, 2011

(65) Prior Publication Data
US 2012/0204998 A1      Aug. 16, 2012

Related U.S. Application Data

(60) Provisional application No. 61/225,506, filed on Jul. 14, 2009.

(30) Foreign Application Priority Data

Jul. 14, 2009   (GB) .................................. 0912177.3

(51) Int. Cl.
| | | |
|---|---|---|
| B65B 1/04 | (2006.01) | |
| B65G 69/18 | (2006.01) | |
| B65B 1/28 | (2006.01) | |
| B65B 39/00 | (2006.01) | |
| B65B 69/00 | (2006.01) | |

(52) U.S. Cl.
CPC ................ *B65G 69/181* (2013.01); *B65B 1/28* (2013.01); *B65B 39/005* (2013.01); *B65B 69/0075* (2013.01)

(58) Field of Classification Search
USPC ........... 141/1, 344, 345, 346, 347; 251/149.9, 251/156
See application file for complete search history.

(56) References Cited

U.S. PATENT DOCUMENTS

| | | | | |
|---|---|---|---|---|
| 5,490,546 A | * | 2/1996 | Lhoest ......................... | 141/346 |
| 6,653,377 B1 | * | 11/2003 | Lloyd et al. .................. | 524/221 |
| RE40,840 E | * | 7/2009 | Lloyd et al. .................. | 524/221 |
| 2005/0236065 A1 | | 10/2005 | Marceau | |

FOREIGN PATENT DOCUMENTS

| | | |
|---|---|---|
| DE | 10 2006 018 279 A1 | 10/2007 |
| EP | 1 175 342 B1 | 8/2006 |
| WO | 94/15835 A1 | 7/1994 |

OTHER PUBLICATIONS

International Search Report mailed May 13, 2011, issued in corresponding International Application No. PCT/GB2010/051151, filed Jul. 14, 2010, 2 pages.

\* cited by examiner

*Primary Examiner* — Timothy L Maust
(74) *Attorney, Agent, or Firm* — Christensen O'Connor Johnson Kindness PLLC (57) ABSTRACT

A coupler assembly to transfer powdered material from a container includes an active valve with a docking part and a passive valve with a complementary docking part. The two docking parts enable the two valves to be secured together such that both the passive valve and the active valve can be opened. The coupler assembly includes a spigot that is movable between a first position in which the spigot allows the active valve to close with the spigot on the opposite side of the active valve to the docking part which engages the passive valve, and a second position in which the active valve is held in an open position and the spigot provides a passage for material passing through the passive valve to flow through the active valve whilst substantially preventing exposure of part of the active valve to any of the flowing material.

28 Claims, 8 Drawing Sheets

CONTAINED TRANSFER OF MATERIALS

This invention relates to a coupler assembly for use in controlling the flow of a material, such as a powder, into or out from a container such as a flexible bag or a bottle. It is especially suited to controlling the flow of powdered material but may also be used with granules, flakes, pastes (wet cake), crystals or perhaps fluids.

Containers are used in a wide variety of applications, from small loads of less than 0.5 kg of, for example, pharmaceutical products, to loads of up to 1 000 kg (typically in Flexible Intermediate Bulk Containers or FIBCs) or even in excess of 30 000 kg of, for example plastic granules and dry powdered or granular food production.

There is often difficulty when connecting the containers to apparatus for filling or emptying them. In particular, it is desirable to create a tight seal to limit contamination of the contents from the environment, and likewise to limit the escape of the contents into the environment during the filling or emptying operation. It may also be desirable to avoid escape of the contents when disconnecting the containers from such apparatus.

One way to create a tight seal is to weld a single ring around the opening of the container. This ring then forms a rigid connector which can be attached to a filling and or emptying apparatus. However, it is difficult and time consuming to achieve an accurate welded fitting of a single ring, and welding may not be suitable for all container materials.

An alternative is proposed in the applicant's earlier UK patent application GB 2 412 652 A in which a connection assembly with a multipart construction is presented, allowing simple attachment of the connection assembly to the container.

In the pharmaceutical industry expensive and potentially health hazardous powders need to be transferred into various powder processing machinery. It is essential that such powders are contained within the processing system for obvious health reasons and that they are not wasted by becoming trapped on obstructions. When powders are transferred into processing equipment often bags containing the powder are docked onto one another using a coupler assembly known as a split butterfly valve which allow the bag and the processing unit to be separately isolated. A split butterfly valve comprises two valves that cannot be operated independently and must be connected together in the middle to allow them to rotate and function. This allows the bag and the unit to be separately isolated reducing the risk of powder escaping either from the bag or back flowing out of the processing equipment.

The problem with these well known split butterfly valves is that they are very expensive, to purchase and maintain, and they do not always provide the level of containment required by certain processes. The passive part of a split butterfly valve can be very heavy and can cause problems when working in conjunction with flexible polyethylene charge bags. Another problem is the release of powder which can occur due to product hang up on the outer edge of the split butterfly diaphragm and side gasket areas. This retained powder can be then released in an uncontained manner when the valves are split.

In accordance with a first aspect, the invention provides a coupler assembly for use in the transfer of powdered material from a container such as a bag or bottle, the coupler assembly comprising an active valve assembly having an active valve and a docking part and a passive valve assembly which comprises a passive valve and a complementary docking part, the two docking parts enabling the two assemblies to be secured together such that both the passive valve and the active valve can be opened to provide a passage for powder through both valves, and in which the coupler assembly further includes a spigot, and in which the coupler assembly is so arranged that the spigot is movable between a first position in which the spigot allows the active valve to close with the spigot on the opposite side of the active valve to the docking part which engages the passive valve assembly, and a second position in which the active valve is held in an open position and the spigot provides a passage for material passing through the passive valve to flow through the active valve whilst substantially preventing exposure of at least part of the active valve to any of the following material.

The invention therefore provides a form of contained powder transfer device which includes an active valve and a passive valve and uniquely a protective spigot which can be moved into place to protect the inner surfaces of the active valve before powder is passed through it from the passive valve. The spigot can then be lowered and contained behind a valve before the valves are split. The spigot prevents any powder contacting the active valve passage or the valve plate or indeed any part of the active valve body, so that when the valves are split after they have been closed there is substantially no contamination on their outer surfaces by powder.

Preferably, the passive valve cannot be opened independently until it is connected and preferably locked onto the active valve. This prevents material passing from the container until the active valve is open.

The coupler assembly may be so arranged that in its second position the spigot extends through the active valve only, or through both the active valve and passive valves. In the later case it may protect them both from exposure to material flowing through the valves.

The spigot may comprise a tube having a first end and a second end, and in the second position the second end of the spigot passes through the active valve assembly. In this position the first end of the spigot preferably forms a seal with a part of the passive valve assembly to substantially prevent the passage of material flowing through the passive valve contacting any part of the active valve. It most preferably forms a seal with the side of the passive valve assembly facing the active valve. This is preferred because, in most cases, where the passive valve provides a closure to a bag or other container of powdered material, this side will be on the outside and so will be free of powder.

The passive valve assembly may include an internal shoulder against which the first end of the spigot abuts when pushed or pressed through the active valve. The second end of the spigot may form an interference fit with the shoulder or with an inwardly directed ring adjacent the shoulder. This fit ensures material is substantially prevented from contaminating either of the valve assemblies.

It is envisaged that coupler assembly will be especially suited to controlling the flow of high value powders for use in the manufacture of pharmaceuticals where high levels of containment are required. Of course, it may also have application in other fields.

The active valve part and the passive valve parts may be completely detachable, the active valve normally being fixed in place and the passive valve fixed to a flexible bag or a bottle or other type of container which can be moved around.

Of course, the active part may be the part fixed to a flexible bag or other container and the passive part may be fixed in position as part of a process plant or such like.

The spigot may comprise an integral part of the active valve assembly, and may be supported relative to the active valve by a suitable mechanism which enables the required movement of the first end of the spigot into the active valve once the active valve is opened.

The mechanism may include a lever or handle which enables an operator to cause movement of the mechanism between its first and second positions, and hence provide the required relative movement between the spigot and the active and, where appropriate, the passive valve or valves.

A flexible seal may be provided which is fixed to or forms part of the spigot. The seal may connect an end of the spigot to the side of the valve opposite the docking part, the seal preventing passage of material from within the spigot between the end of the spigot and the side of the valve opposite the docking part. This seal may, for instance, comprise a bellows which is fixed at one end to the spigot some distance from the tip of the first end and also to the side of the active valve opposite the docking part.

Alternatively the seal may comprise a ring of compressible material that is located around the spigot towards the free end such that when the spigot is moved into its second position within the active valve the seal engages the passive valve part and may be compressed against the active valve to enhance the seal.

The active valve may comprise a slide valve comprising a valve body having an inlet port and an outlet port connected by a passage, the ports being selectively isolated from one another by a movable valve plate which is supported in guide slots located between the inlet and outlet port or on rollers and in which the valve plate is free to move between a closed position in which it blocks off the passage and an open position in which it unblocks at least part, and preferably all, of the passage. When closed no powder can flow from the inlet to the outlet through the passage, but when open the powder can flow through the passage within the spigot that is located within the valve passage to protect the valve passage. This way the material may be restrained from contaminating the valve plate, or any part of the valve passage.

The passive valve may similarly comprise a slide valve with a valve plate that closes off a passage, and again when in the second position the spigot may protect this passage. In particular, the spigot may protect the exposed slider voids, which are left when the active or passive slides are retracted. Indeed, the spigot may prevent the contents of the container coming into contact with any part of the valves, including the slider voids.

The valve plates of both valves may be secured together so that they can be moved in unison.

Other types of valve may be provided. For instance one or both of the valve assemblies may each comprise an iris valve in which the throttle comprises a tube of flexible material coupled rigidly at each end to a respective one of two flanges, one flange forming the input port and the other flange the output port, the two flanges being free to rotate relative to one another to twist the tube of flexible material thereby to block flow through the valve assembly or to untwist the tube to allow flow of powder or to allow insertion of the first end of the spigot as appropriate.

A handle may be provided which enables an operator to open and close the active valve, and at the same time the passive valve. The handle may be part of the active valve.

The active valve and the passive valve that is docked to it may together form a contained powder transfer device.

The spigot may be substantially rigid and solid walled so no material flowing through it can escape through the spigot walls to contaminate the valves. It may for example be a tube, which may be cylindrical. The external diameter of the spigot may be smaller than the internal diameter of the active valve over at least the first end portion which passes though the active valve.

The coupler assembly may comprise two active valves arranged in parallel and spaced apart, the spigot being located in its first position wholly between both valves to allow them to be closed, and both valves being movable towards one another when the active valves are open so that the spigot moves to its second position in which it protects both valves in the manner described herein. Alternatively the valves may be fixed relative to one another and the spigot may either extend, perhaps telescopically, or otherwise move into a second position in which it protects both valves.

The or each passive valve may include a lock mechanism which prevents it from opening unless it is docked to an active valve part. This may comprise one or more lugs or protrusions on the active valve part which deflect one or more tabs on the passive valve part when the passive valve part is docked to the active valve part, the tabs when not deflected preventing opening of the passive valve and allowing opening of the passive valve part. Alternatively, the one or more lugs may be provided on the passive valve part and one or more tabs on the active part.

The tabs may be provided on the valve plate and may selectively engage or release from recesses in the corresponding valve body to prevent opening, or the tabs may be provided on the valve body and selectively engage or release from recesses in the valve plate.

Optionally a similar arrangement may be provided to prevent opening of the active valve unless docked with a passive valve.

One of the docking parts of the coupler assembly may comprise a recess into which the other docking part may be located by a snap fit. The recess may form part of the active valve part.

A lip may be provided around a perimeter of the recess and a groove may be provided on a perimeter of the passive valve part which engages the groove. Alternatively the lip may be provided on the passive valve and may snap into a groove on the active valve.

The passive valve assembly may be secured to a container such as a flexible bag or a bottle having a body and an outlet. A clamp, or other additional valve such as a butterfly valve, may be provided as part of, or attached to the bag or bottle, between the body of the bag which holds the material to be discharged and the coupler assembly to isolate the coupler assembly from the material until the clamp or valve is opened. This clamp or valve helps prevent the content of the bag contaminating the coupler assembly.

In a preferred arrangement the container is a bag with a flexible neck and the clamp clamps the neck shut. The clamp or other valve should, of course, be releasable or openable at the time the material is to be discharged, i.e. after the transfer assembly has been fixed to the docking station, the valves opened and the spigot pressed through the valves to restrict contact of the material with the valves.

The main body of the bag may contain the material to be discharged.

The bag may comprise an intermediate bulk container (IBC).

A wiper may be provided which is secured to the body of the passive valve assembly such that it sweeps the surface of the valve plate that faces away from the active valve assembly to collect any powder which may be present on the surface of the valve plate. Since this surface of the valve plate will in a typical use be located inside of a container to which the passive valve is secured the applicant has appreciated that there is a low risk that small amounts of powder may collect on that surface. The clamp or additional valve should prevent this contamination but the applicant has appreciated that the provision of the wiper helps remove any contamination if it is present.

The wiper may comprise a strip of adhesive material or any other material that will attract and retain powder.

The active valve, or each active valve of a double active valve coupler assembly may be connected to a respective container or to materials processing equipment or to a pipe that may feed into processing equipment or a container.

A seal may be provided at the first end of the spigot. It may be located at least partially within a groove in an end face of the spigot. It may comprise a substantially rigid ring which is located in the groove with an overmolded ring of softer material. The rigid ring ensures that the softer ring does not "roll off" the end face of the spigot.

An additional seal may be provided on the passive valve which may engage the sliding valve part. This may again comprise a rigid part received at least partially in a groove and a softer overmolded part. The seal prevents material escaping between the sliding valve part and the fixed part of the passive valve assembly.

According to a second aspect the invention provides a passive valve assembly comprising a valve body having a passage therethrough, a valve plate which is located along at least two edges in grooves provided in the body such that in a closed position the plate prevents the flow of material through the passage and in an open position permits flow of material through that passage, and optionally a wiper which is fixed to the valve body in such a position that as the plate is moved from its closed position to its open position the wiper sweeps across the surface of the plate.

The wiper may be provided so that only one side of the plate is swept.

The wiper may comprise a strip of adhesive material or any other material that will attract and retain powder.

The valve body may comprise a planar body with an opening formed within it and in which two opposing edges on one side of the body are provided with a raised lip within which each define an inwardly facing slot into which a corresponding edge of the valve plate is slidingly received.

The passive valve assembly may be provided with a flange suitable for use with a tri-clamp connector by providing a raised annular wall which is provided with a radially outwardly directed lip at, or near, to its terminal end.

The valve body and the lips and coupler ring may be plastic and may be integrally formed. The valve plate may also be made of plastic or metal material.

The valve body may also be provided with a docking part that permits it to dock with an active valve assembly such that the passive valve and active valve According to a third aspect the invention provides an active valve assembly for use in combination with a passive valve assembly to provide the coupler assembly of the first aspect of the invention.

According to a fourth aspect the invention provides in combination a passive valve assembly of the second aspect, a container having a flexible neck which is secured to and selectively closed by the passive valve assembly and a releasable clamp which extends across the neck to selectively isolate the passive valve on one side of the clamp from the content of the container on the other side of the clamp.

The container may comprise a flexible bag and may contain powdered material on the side of the clamp opposite the valve. The neck of the bag on the side facing the valve may be substantially free of powder or other material. This may be achieved by careful filling of the container prior to applying the clamp, or cleaning of the neck after fitting the clamp.

The valve body and the lips and coupler ring may be plastic and may be integrally formed. The valve plate may also be made of plastic or metal material.

According to a fifth aspect, the invention provides a method of discharging material from a container using the coupler assembly of the first aspect of the invention, comprising docking a container fitted with a clamp and a closed passive valve to a closed active valve assembly, opening the active and passive valves, moving the spigot into its second position where it extends through at least the active valve to seal with a part of the passive valve assembly, removing the clamp, and discharging at least some of the contents of the container through the coupler assembly whereby the presence of the spigot substantially prevents the material contaminating at least the active valve.

The method may further comprise subsequently closing the passive valve to prevent further flow of material, moving the spigot to its first position, closing the active valve and separating the active and passive valve assemblies.

There now follows, by way of example two embodiments of the invention, described with reference to the accompanying drawings, in which.

Figure 1:
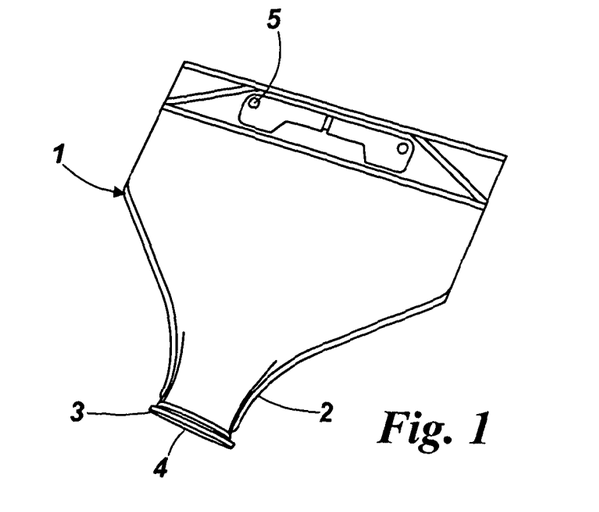
FIG. 1 shows a charge bag which is well known in the pharmaceutical industry for containing powder.
Figure 2A:
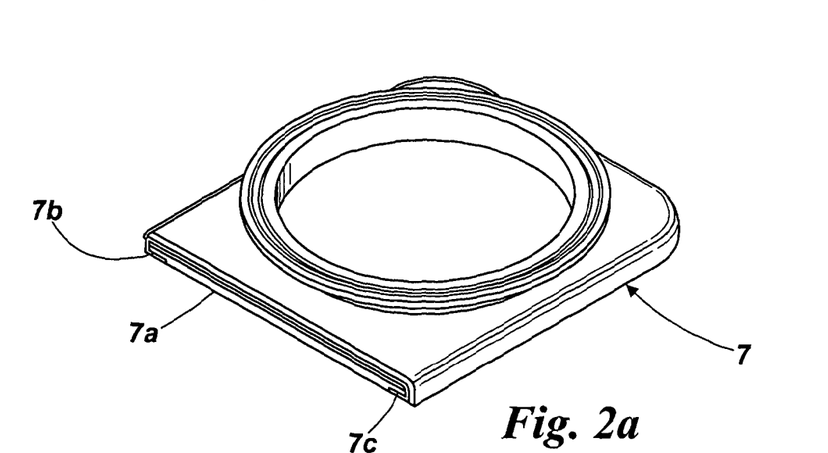
FIGS. 2a, 2b, 2c and 2d show the passive slide valve of the coupler assembly in four views, the valve is shown closed in 2c and open in 2d.
Figure 2B:
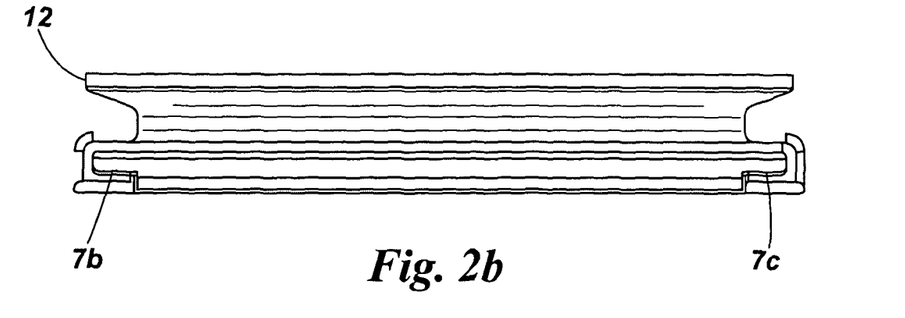
Figure 2C:
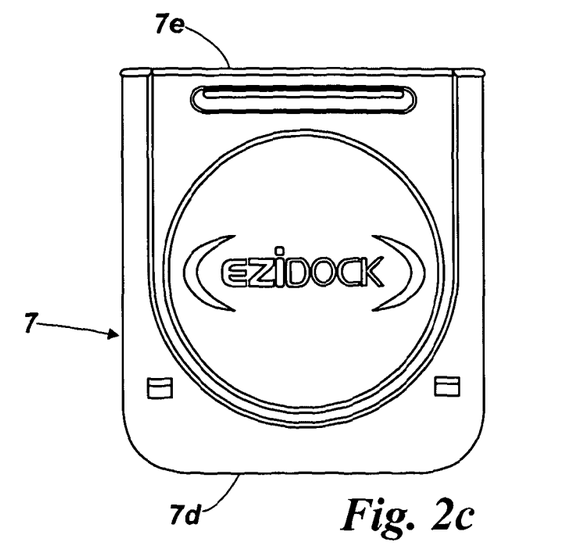
Figure 2D:
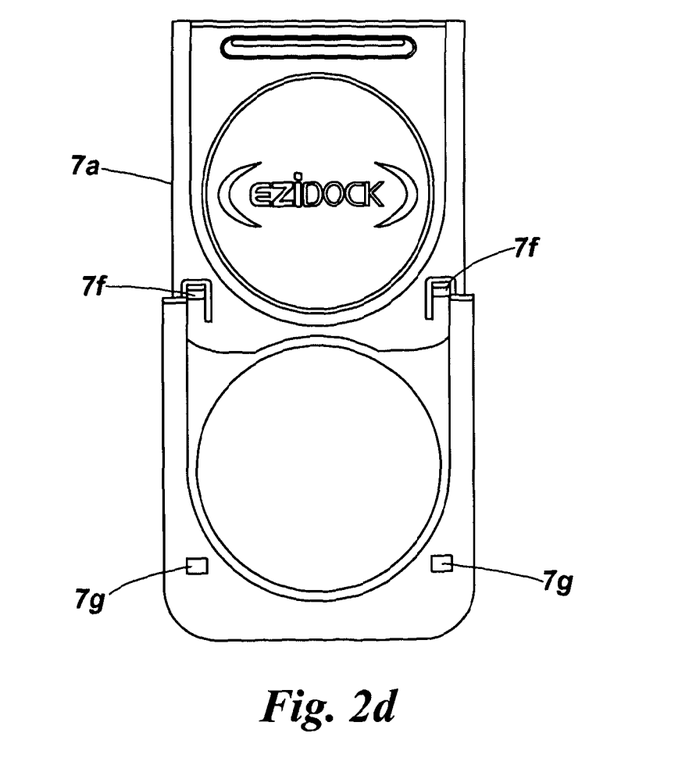

FIG. 1 shows an example of a typical container 1 for the transport and containment of materials such as those in powder form used in the pharmaceutical industry. Such containers are well known, and are sold under the name "charge bag". They comprises a flexible polythene bag with a funnelled neck 2 onto which a docking ring 3 is mechanically fastened (see GB2412652 for further details) to form an opening 4. The ring forms half of a seal between the bag and the input of a powder processing unit. The bag can be suspended from the holes 5 on the top of the bag so powder in the bag moves down the neck and out through the opening 4 under gravity. The top of the bag containing the holes 5 are separately sealed from the main volume which contains the powder. Charge bags are disposable and may be incinerated after use.

Figure 6:
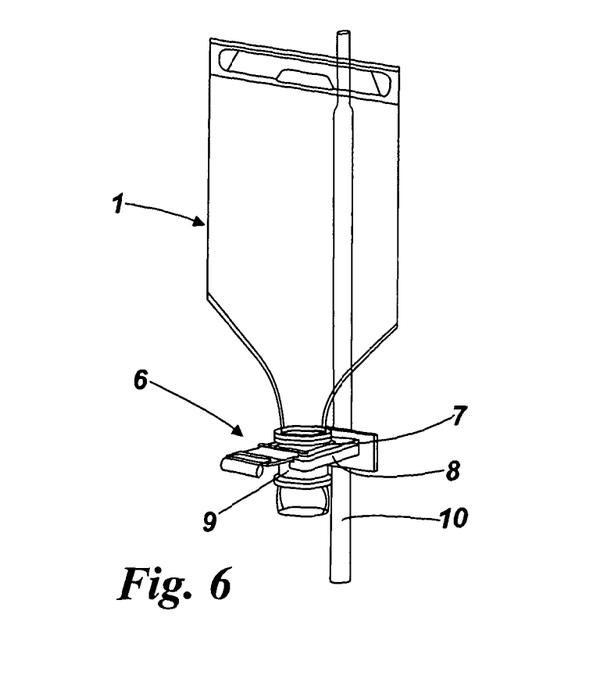
FIG. 6 shows the coupler assembly with the charge bag connected to the passive valve which is attached to the active slide valve.

FIG. 6 shows an embodiment of a coupler assembly 6 connected to a charge bag both being supported on a discharge frame 10. The coupler assembly allows the powder material in the charge bag to be safely connected to and transferred into the input of a powder processing unit without powder escaping to the external environment. The coupler assembly 6 comprises a passive slide valve 7, an active slide valve 8 and a spigot 9.

Figure 5:
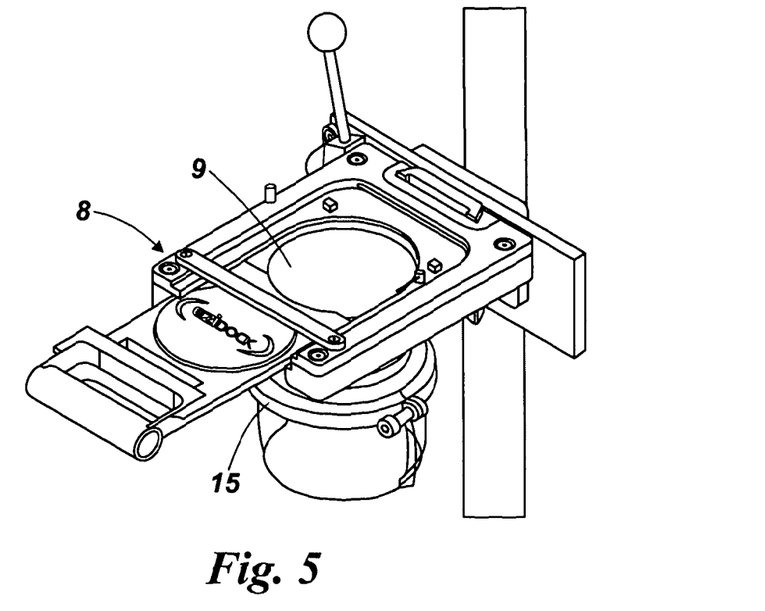
FIG. 5 shows the active slide valve open with the passive valve removed and the spigot partially inserted covering the internal walls of the active valve.

The passive slide valve 7 of this embodiment is shown in more detail in FIGS. 2a to 2d. It includes a moveable plate 7a between two guide rails 7b, 7c which can be inserted to block the channel through the coupler assembly sealing in the contents of the charge bag 1. The active valve can be opened by drawing the handle 11 out in a direction parallel to the plain of the valve as shown in FIG. 5. On one side of the valve there is a connecting ring 12 which provides a mechanical means of joining and sealing a charge bag to the valve. On the opposite side, the valve is flat to sit flush with the active valve 8. The passive valve 7 is made from plastic materials such as nylon or High Density Polyethylene (HDPE) and is a low cost part which may be disposed of with the used charge bag. The passive slide valve provides containment of any powder residues remaining within the bag which otherwise may escape to the external environment when exchanging charge bags.

The active slide valve 8 (shown in FIG. 4) of this embodiment includes a second movable plate 8a which operates in unison with the passive slide valve 7 when opening the handle 11. The active slide valve 8 opens and seals closed the passage through to the input of the processing unit, preventing any back flow of powder escaping while exchanging charge bags. The active valve 8 is attached to a mechanism 13 which vertically raises and lowers the active valve by operating the lever 14. There is approximately 15 mm of movement between the raised and lowered positions, relative to the spigot 9 which is fixed in position beneath. The active valve is a reusable part which is not exchanged on replacing a fresh charge bag.

The passive valve is fitted to the active valve 8 by inserting closed end 7d underneath the restraint 8b on the active valve and pushing the open end 7e down so that it sits flat on the active valve. When the two valves are flat, spring clip 8c locks over the passive valve, holding it in place. To remove the passive valve, the button 8e below the handle on the active valve is depressed, releasing the clip 8c. The passive valve can then be maneuvered out from under the restraint 8b and removed.

Another feature of this embodiment is that the passive valve can only be opened once it is docked onto the active valve which releases a locking mechanism. Lugs 7f (shown in FIG. 2d) are provided on the plate 7a which lock into holes 7g provided on the valve body. When the passive valve is positioned on the active valve the lugs 7f are pushed clear of the holes 7g by two corresponding protrusions 8f on the active valve, allowing the plate of the passive valve to slide within the guide rails.

The spigot 9 of this embodiment is a round tube that protects the internal walls of the passive and active valves from exposure to powder that flows through the coupler assembly 6. The spigot 9 is always fully contained and never exposed to the external environment. When the active part is lowered, the spigot moves through the passive and active valves covering their internal walls and protecting them from exposure to the powder. This ensures the walls of the valves remain clean so that when a charge bag is replaced and the passive and active valves are separated, no powder is left on their walls which could escape.

Figure 12:
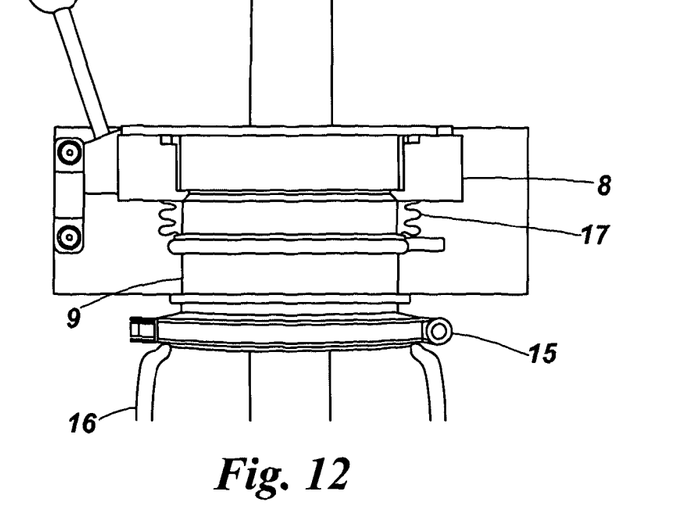
FIG. 12 shows a front view of the coupler assembly where the flexible membrane can be seen joining the spigot and active valve.

As shown in FIG. 12, the spigot 9 is sealed to the flexible chute 16 of the processing unit at one end with a docking ring 15 and on its upper end there is a flexible membrane 17 which seals the gap between the spigot 9 and the active valve 8 so there is never a gap between the active valve and the spigot which could allow powder residues left on the spigot to escape. When the active part is dropped down onto the spigot this membrane 17 crushes down to allow relative movement between the two parts.

Figure 7:
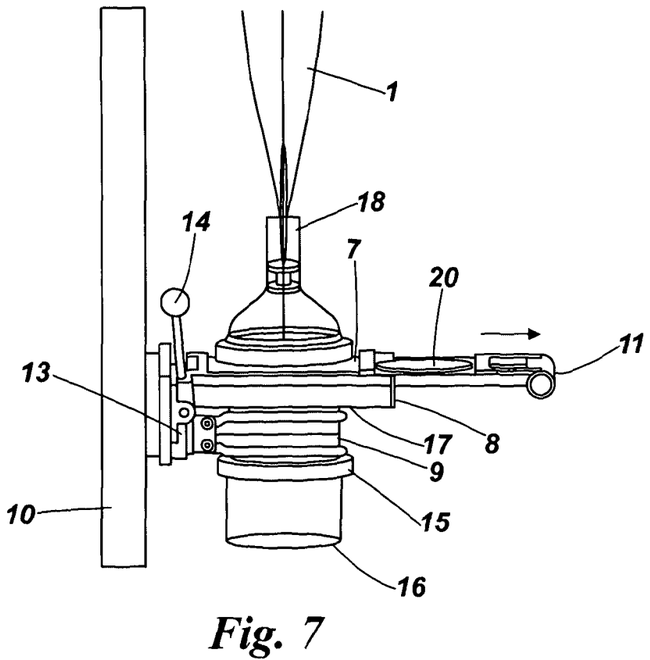
FIG. 7 shows the coupler assembly of FIG. 3 with the passive and active valves withdrawn.
Figure 11:
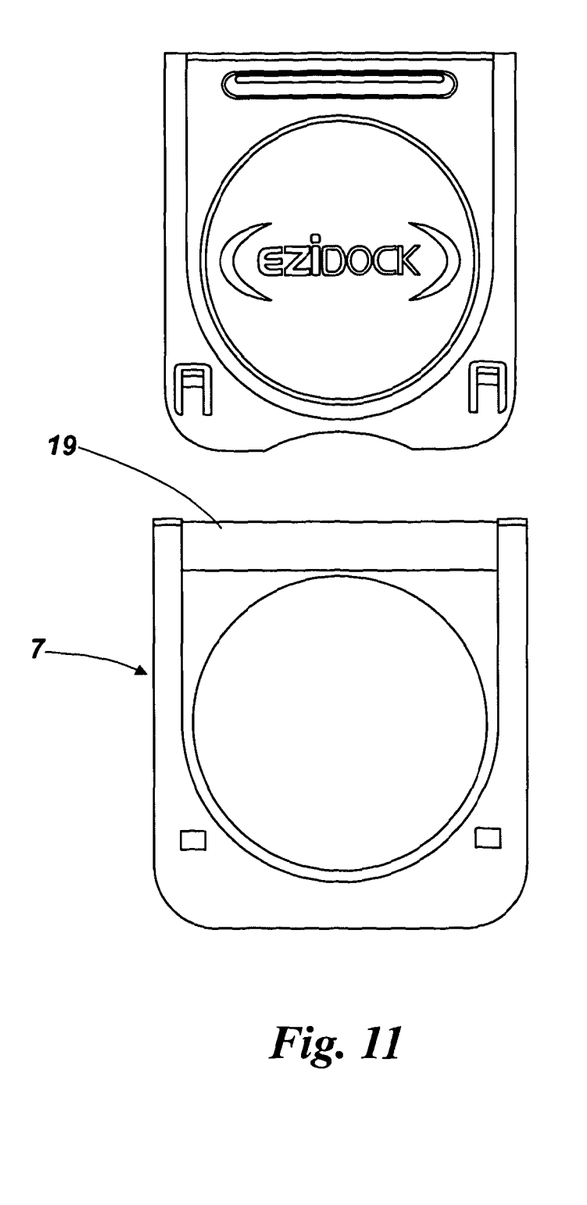
FIG. 11 shows an adhesive strip which may be added to the passive valve to retain any powder residue which may exist on the top of the passive slide valve prior to opening.

FIG. 11 shows an adhesive strip 19 fitted to the passive valve 7 which improves containment by cleaning, retaining or trapping any residues off the topside of the passive valve as it is opened. Although the powder should be fully retained within the charge bag by the tri-clamp prior to its release, there is the possibility small residues may reside around the opening of the bag. When the bag is docked onto the passive valve these residues may land on the top surface 20 of the valve body around the neck. Opening the valve then exposes this top surface 20 to the external atmosphere (as shown in FIG. 7). By placing the adhesive strip 19 as shown in FIG. 11, the top surface is wiped against this adhesive on opening the valve and any residues are retained in the adhesive and prevented from escaping.

Method of Providing Containment

The coupler assembly when used in the following way can provide a cost effective method of connecting a charge bag to an input of a powder processing unit without powder escaping to the external environment. Once the bag has been emptied it can also be sealed and removed in a fully contained manner.

Figure 3:
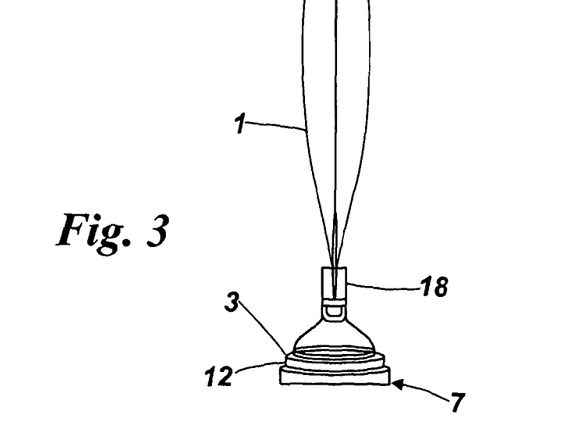
FIG. 3 shows a charge bag coupled to the passive slide valve of the coupler assembly.

A passive slide valve 7 should first be coupled to the charge bag 1 with a docking ring 3, as shown in FIG. 3. The powder is initially sealed within the bag by a standard tri-clamp hygiene clamp 18.

The charge bag can then be hung on the discharge frame 10.

Figure 4:
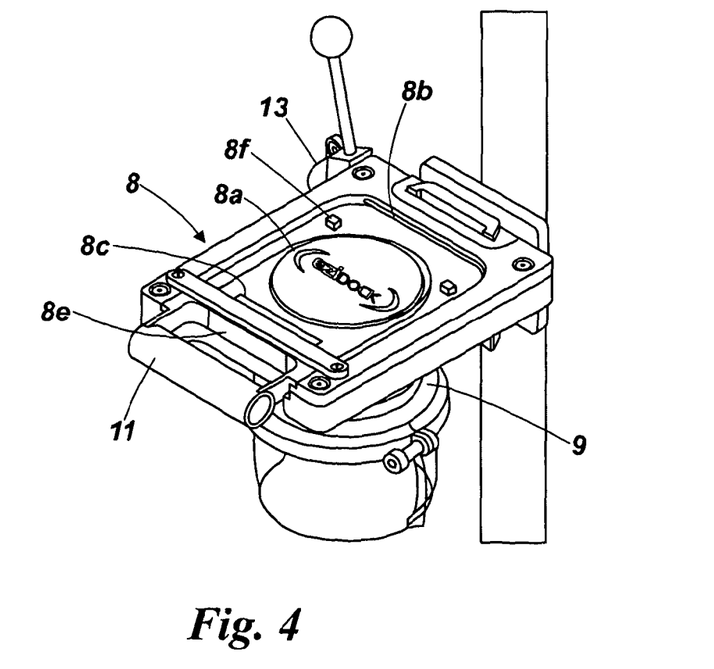
FIG. 4 shows the active slide valve closed ready to receive the passive slide valve shown in FIGS. 2 and 3.

The passive slide valve can then be clipped onto to the active part of the coupler assembly which is supported on the discharge frame; the active part is shown in FIG. 4 awaiting the attachment of the passive valve.

The passive and active slide valves are then opened by drawing out the handle as shown in FIG. 5.

Figure 8:
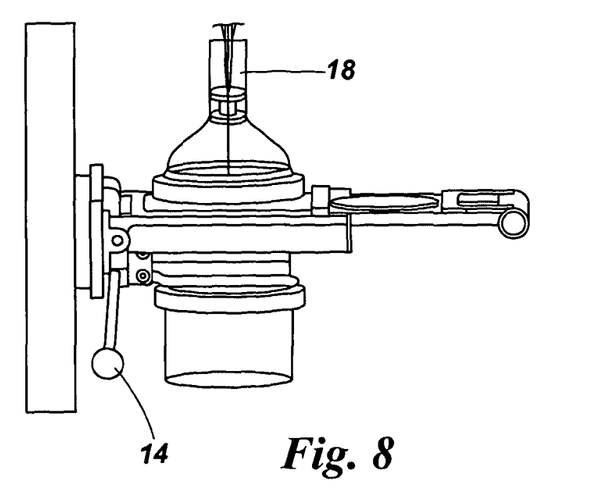
FIG. 8 shows the coupler assembly of FIG. 4 with the active and passive slide valves lowered over the spigot.

With the valves open, the valves can be lowered into position over the spigot 9 by dropping the lever into the position shown in FIG. 8.

Figure 9:
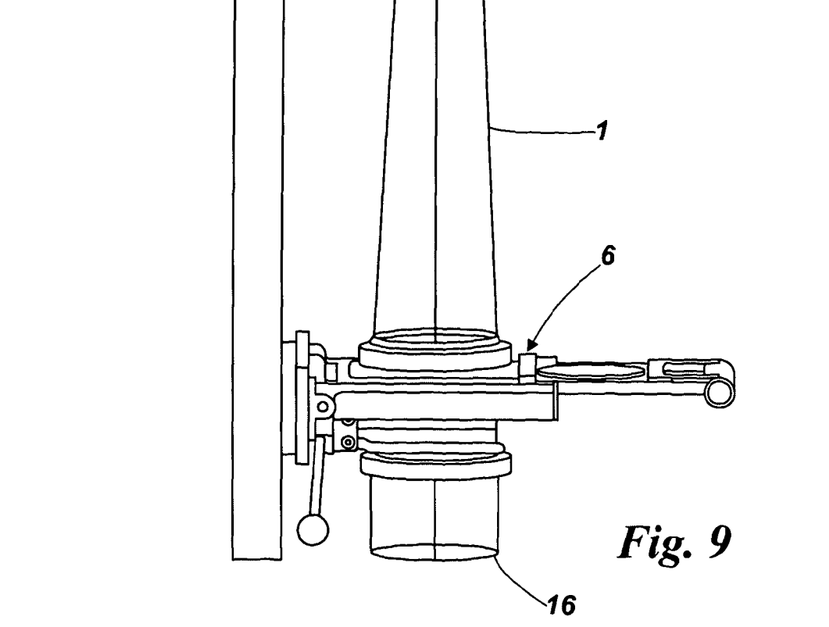
FIG. 9 shows the coupler assembly of FIG. 4 with the tri-clamp removed from the charge bag and the powder discharging.

With the spigot in place the internal walls and exposed slider voids of the valves are protected from exposure to powder and the tri-clamp 18, holding the powder within the charge bag 1, can now be released as shown in FIG. 9.

The powder can flow from the bag 1 through the coupler assembly 6 unrestricted to the input chute 16. Virtually no powder is wasted by becoming trapped in the couple assembly which would also pose a containment risk.

When the bag is empty the process is reversed, firstly the valves 7, 8 must be raised off the spigot 9. Importantly, any powder that is left on the top rim of the spigot is retracted with the spigot below the active slide valve 8.

The valves are then closed and the passive slide valve is unclipped from the active with the charge bag 1 remaining attached. The passive slide valve and the charge bag 1 can then be disposed of and the external surfaces of the active valve are left clean to receive another passive slide valve.

Figure 10:
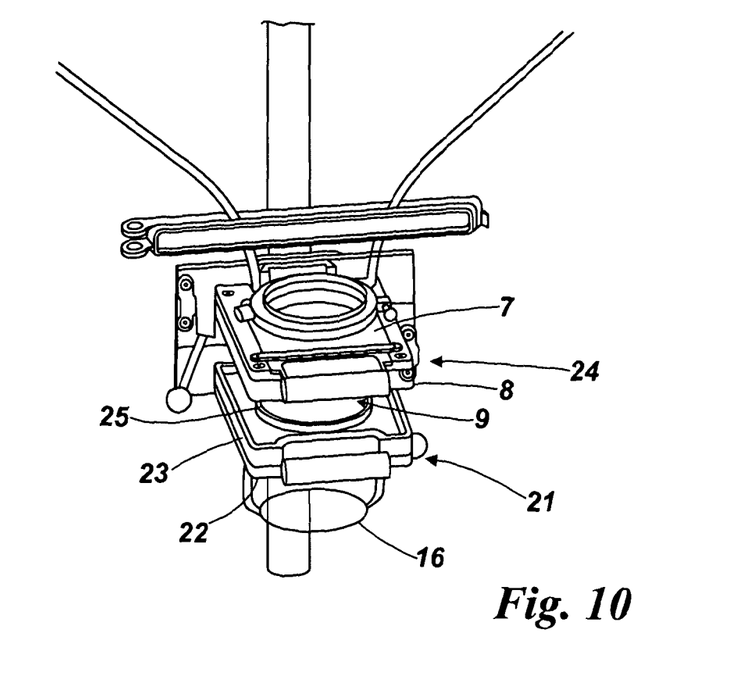
FIG. 10 shows a second embodiment of the invention for a double coupler assembly in which two sets of active and passive valves are used to isolate the spigot.
Figure 13:
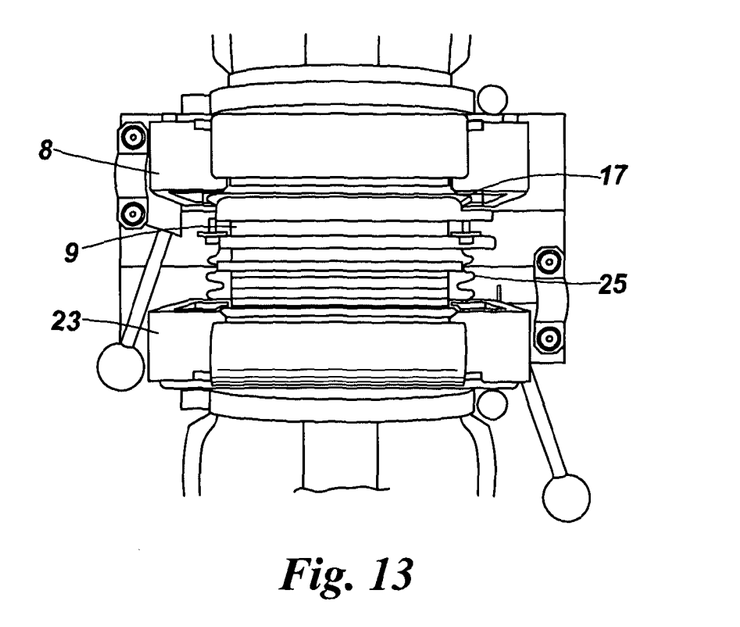
FIG. 13 shows a front view of the double coupler assembly of FIG. 10.

FIG. 10 shows a second embodiment of the invention in which a second set 21 of passive 22 and active 23 slide valves are positioned below the spigot 9 as well as above. This arrangement functions in the same way as the first embodiment only now the lower 21 and upper 24 valves sandwich the spigot 9 so that it can be isolated and removed from the coupler assembly for cleaning when necessary. The lower valves 21 can be raised up and down so that the spigot 9 (which is in a fixed position) moves through the valves to protect their inner walls and exposed slider voids from coming into contact with the powder. The valves below the spigot are arranged with the active 23 valve on top of the passive valve 22. The passive valve is connected to the input of the processing unit 16 and the active joins the spigot with a flexible membrane 25 in the same way as the upper active valve, as can be seen in FIG. 13. In this arrangement the spigot 9 can be removed with any remaining powder contained between the upper 8 and lower 23 active valves. The input chute 16 is also sealed by the passive valve 22 of the lower set 21.

The invention claimed is:

1. A coupler assembly for use in the transfer of powdered material from a container such as a bag or bottle, the coupler assembly comprising an active valve assembly having an active valve and docking part having an outer surface and an internal passage through which material may flow through the valve assembly when opened and a passive valve assembly which comprises a passive valve and a complimentary docking part having an outer surface and an internal passage through which material can flow through the passive valve assembly when opened, the two docking parts enabling the two assemblies to be secured together such that both the passive valve and active valve can be opened and the internal passageway together provide a passage for powder through both valves, and in which the coupler assembly further includes a spigot, and in which the coupler assembly is so arranged that the spigot is movable between a first position in which the spigot allows the active valve to close with the spigot on the opposite side of the active valve to the docking part which engages the passive valve assembly, and a second position in which the active valve is held in an open position and the spigot projects through both the active valve and passive valve to provide a passage for material passing through the passive valve to flow through the active valve whilst protecting the internal passages of both the active valve assembly and the passive valve assembly so that on subsequent closure of the active valve and passive valve material that has stuck to the passive valve or active valve cannot come into contact with the outer surfaces of both the active valve assembly and the passive valve assembly.

2. A coupler assembly according to claim 1 in which the passive valve cannot be opened independently until it is connected and preferably locked onto the active valve.

3. A coupler assembly according to claim 1 which is so arranged that in its second position the spigot extends through the active valve only.

4. A coupler assembly according to claim 1 in which the spigot comprises a tube having a first end and a second end, and in the second position the second end of the spigot passes through the active valve assembly.

5. A coupler assembly according to claim 4 in which the first end of the spigot forms a seal with a part of the passive valve assembly to substantially prevent the passage of material flowing through the passive valve contacting any part of the active valve.

6. A coupler assembly according to claim 5 in which the passive valve assembly includes an internal shoulder against which the first end of the spigot abuts when pushed or pressed through the active valve.

7. A coupler assembly according to claim 1 in which the active valve and the passive valve are detachable, the active valve normally being fixed in place and the passive valve fixed to a flexible bag or a bottle or other type of container which can be moved around.

8. A coupler assembly according to claim 1 in which the spigot comprises an integral part of the active valve assembly and is supported relative to the active valve by a mechanism which enables the required movement of the spigot into the active valve once the active valve is opened.

9. A coupler assembly according to claim 8 in which the mechanism includes a lever or handle which enables an operator to cause movement of the mechanism between its first and second positions, and hence provide the required relative movement between the spigot and the active and passive valves.

10. A coupler assembly according to claim 1 in which a flexible seal is provided which is fixed to or forms part of the spigot and which connects an end of the spigot to the side of the valve opposite the docking part, the seal preventing passage of material from within the spigot between the end of the spigot and the side of the valve opposite the docking part.

11. A coupler assembly according to claim 1 in which the active valve comprises a slide valve comprising a valve body having an inlet port and an outlet port connected by a passage, the ports being selectively isolated from one another by a movable valve plate which is supported in guide slots located between the inlet and outlet port or on rollers and in which the valve plate is free to move between a closed position in which it blocks off the passage and an open position in which it unblocks at least part of the passage.

12. A coupler assembly according to claim 11 in which the passive valve comprises a slide valve with a valve plate that closes off a passage, and when in the second position the spigot protects this passage.

13. A coupler assembly according to claim 12 in which the valve plates of both the active and the passive valve are secured together so that they can be moved in unison.

14. A coupler assembly according to claim 1 which includes a handle which enables an operator to open and close the active valve, and at the same time the passive valve.

15. A coupler assembly according to claim 1 in which the spigot is substantially rigid and solid walled so no material flowing through it can escape through the spigot walls to contaminate the valves.

16. A coupler assembly according to claim 1 wherein the active valve assembly comprises two active valves arranged in parallel and spaced apart, the spigot being located in its first position wholly between both valves to allow them to be closed, and both valves being movable towards one another when the active valves are open so that the spigot moves to its second position in which it protects both valves.

17. A coupler assembly according to claim 1 in which the passive valve includes a lock mechanism which prevents it from opening unless it is docked to an active valve part.

18. A coupler assembly according to claim 17 in which the lock mechanism comprises one or more lugs or protrusions on the active valve part which deflect one or more tabs on the passive valve part when the passive valve part is docked to the active valve part, the tabs when not deflected preventing opening of the passive valve and allowing opening of the passive valve part.

19. A coupler assembly according to claim 17 in which one of the docking parts of the coupler assembly comprises a recess into which the other docking part may be located by a snap fit.

20. A coupler assembly according to claim 19 in which a lip is provided around a perimeter of the recess and a groove is provided on a perimeter of the passive valve part which engages the groove.

21. A coupler assembly according to claim 1 in which the passive valve assembly is secured to a container such as a flexible bag or a bottle having a body and an outlet and a clamp, or other additional valve such as a butterfly valve, is provided as part of, or attached to the bag or bottle, between the body of the bag which holds the material to be discharged and the coupler assembly to isolate the coupler assembly from the material until the clamp or valve is opened.

22. A coupler assembly according to claim 11 which further comprises a wiper which is secured to the body of the passive valve assembly such that it sweeps the surface of the valve plate that faces away from the active valve assembly to collect any powder which may be present on the surface of the valve plate.

23. A coupler assembly according to claim 1 in which the spigot comprises a tube, and in the second position an end of the tube projects into the passage of the passive valve to provide an interference fit with one of a shoulder of the passive valve or an inwardly directed ring adjacent the shoulder.

24. A coupler assembly according to claim 23 which is so arranged that in its second position the spigot extends through the active valve only.

25. A coupler assembly according to claim 24 in which the spigot comprises a tube having a first end and a second end, and in the second position the second end of the spigot passes through the active valve assembly.

26. A coupler assembly according to claim 25 in which the first end of the spigot forms a seal with a part of the passive valve assembly to substantially prevent the passage of material flowing through the passive valve contacting any part of the active valve, the passive valve assembly including an internal shoulder against which the first end of the spigot abuts when pushed or pressed through the active valve.

27. A method of discharging material from a container connected to a coupler assembly for use in the transfer of powdered material from a container such as a bag or bottle, the coupler assembly comprising an active valve assembly having an active valve and docking part having an outer surface and an internal passage through which material may flow through the valve assembly when opened and a passive valve assembly which comprises a passive valve and a complementary docking part having an outer surface and an internal passage through which material can flow through the passive valve assembly when opened, the two docking parts enabling the two assemblies to be secured together such that both the passive valve and active valve can be opened and the internal passageway together provide a passage for powder through both valves, and in which the coupler assembly further includes a spigot, and in which the coupler assembly is so arranged that the spigot is movable between a first position in which the spigot allows the active valve to close with the spigot on the opposite side of the active valve to the docking part which engages the passive valve assembly, and a second position in which the active valve is held in an open position and the spigot projects through both the active valve and passive valve to provide a passage for material passing through the passive valve to flow through the active valve whilst protecting the internal passages of both the active valve assembly and the passive valve assembly so that on subsequent closure of the active valve and passive valve material that has stuck to the passive valve or active valve cannot come into contact with the outer surfaces of both the active valve assembly and the passive valve assembly, which method comprises:

docking a container fitted with a clamp and a closed passive valve to a closed active valve assembly, opening the active and passive valves, moving the spigot into its second position where it extends through at least the active valve to seal with a part of the passive valve assembly, removing the clamp, and discharging at least some of the contents of the container through the coupler assembly whereby the presence of the spigot substantially prevents the material contaminating at least the active valve.

28. A method according to claim 27 which further comprises subsequently closing the passive valve to prevent further flow of material, moving the spigot to its first position, closing the active valve and separating the active and passive valve assemblies.

* * * * *